US011396163B2

(12) United States Patent
Iwamoto et al.

(10) Patent No.: US 11,396,163 B2
(45) Date of Patent: Jul. 26, 2022

(54) INTERMEDIATE FILM FOR LAMINATED GLASS, AND LAMINATED GLASS (71) Applicant: SEKISUI CHEMICAL CO., LTD., Osaka (JP)

(72) Inventors: Tatsuya Iwamoto, Kouka (JP); Shougo Yoshida, Kouka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 279 days.

(21) Appl. No.: 15/123,664

(22) PCT Filed: Mar. 27, 2015

(86) PCT No.: PCT/JP2015/059781
§ 371 (c)(1),
(2) Date: Sep. 5, 2016

(87) PCT Pub. No.: WO2015/147302
PCT Pub. Date: Oct. 1, 2015

(65) Prior Publication Data
US 2017/0072665 A1 Mar. 16, 2017

(30) Foreign Application Priority Data

Mar. 28, 2014 (JP) .............................. JP2014-069975
Mar. 28, 2014 (JP) .............................. JP2014-069976

(51) Int. Cl.
*B32B 17/10* (2006.01)
*B32B 27/30* (2006.01)
*B32B 27/22* (2006.01)
*C08K 5/3435* (2006.01)
*B32B 27/18* (2006.01)
*B32B 27/08* (2006.01)
*B32B 27/42* (2006.01)

(52) U.S. Cl.
CPC .. *B32B 17/10761* (2013.01); *B32B 17/10036* (2013.01); *B32B 17/10678* (2013.01); *B32B 27/08* (2013.01); *B32B 27/18* (2013.01); *B32B 27/22* (2013.01); *B32B 27/306* (2013.01); *B32B 27/42* (2013.01); *C08K 5/3435* (2013.01); *B32B 2307/30* (2013.01); *B32B 2605/006* (2013.01); *C08J 2329/14* (2013.01); *C08K 2201/012* (2013.01)

(58) Field of Classification Search
CPC ... B32B 17/10761; B32B 27/42; B32B 27/22; B32B 17/10678; B32B 17/10036; B32B 27/306; B32B 27/08; B32B 27/18; B32B 2307/30; B32B 2605/006; B32B 2307/71; C08K 5/49; C08K 5/13; C08K 5/521; C08K 5/101; C08K 5/3435; C08K 5/103; C08K 2201/012; C08J 5/18; C08J 2329/14

See application file for complete search history.

(56) References Cited

U.S. PATENT DOCUMENTS

| 3,718,516 | A | * | 2/1973 | Buckley | ............ B32B 17/10036 |
| | | | | | 156/106 |
| 5,340,654 | A | * | 8/1994 | Ueda | ................. B32B 17/10009 |
| | | | | | 427/437 |
| 5,384,346 | A | | 1/1995 | Gutweiler et al. | |
| 8,872,019 | B2 | * | 10/2014 | Keller | ................... H01L 31/048 |
| | | | | | 136/251 |
| 2003/0139520 | A1 | | 7/2003 | Toyama et al. | |
| 2004/0234778 | A1 | * | 11/2004 | Fukatani | ........... B32B 17/10036 |
| | | | | | 428/426 |
| 2005/0249959 | A1 | | 11/2005 | Okamoto et al. | |
| 2007/0134487 | A1 | | 6/2007 | Marumoto et al. | |
| 2007/0231584 | A1 | | 10/2007 | Hasegawa | |
| 2009/0035583 | A1 | | 2/2009 | Fisher | |
| 2009/0162671 | A1 | | 6/2009 | Marumoto | |
| 2010/0124647 | A1 | | 5/2010 | Keller et al. | |
| 2010/0206374 | A1 | | 8/2010 | Karpinski et al. | |
| 2011/0061714 | A1 | | 3/2011 | Keller | |

(Continued)

FOREIGN PATENT DOCUMENTS

| CN | 1317536 A | 10/2001 |
| CN | 102089254 A | 6/2011 |

(Continued)

OTHER PUBLICATIONS

The First Office Action for the Application No. 201580006275.9 from The State Intellectual Property Office of the People's Republic of China dated May 31, 2018.
The First Office Action for the Application No. 201580006289.0 from The State Intellectual Property Office of the People's Republic of China dated May 31, 2018.
Final Office Action for the U.S. Appl. No. 15/123,670 from the United States Patent and Trademark Office dated Sep. 17, 2018.
Supplementary European Search Report for the Application No. EP 15 76 8966 dated May 29, 2017.
Supplementary European Search Report for the Application No. EP 15 76 8065 dated Jun. 1, 2017.
Written Opinion of the International Searching Authority (PCT/ISA/237) for Application No. PCT/JP2015/059781 dated May 19, 2015 (English Translation mailed Oct. 13, 2016).

(Continued)

*Primary Examiner* — Cheng Yuan Huang
(74) *Attorney, Agent, or Firm* — Cheng Law Group, PLLC (57) ABSTRACT

There is provided an interlayer film for laminated glass making a gap difficult to be generated at an end part of the sheet of laminated glass and enabling an increase in the YI value measured at the end part of the sheet of laminated glass to be suppressed. The interlayer film for laminated glass according to the present invention is provided with a first layer which contains a polyvinyl acetal resin and a plasticizer, and a second layer which is arranged on a first surface side of the first layer and contains a polyvinyl acetal resin and a plasticizer, the first layer further contains a hindered amine light stabilizer having an alkyl group to bond to the nitrogen atom of a piperidine structure or an alkoxy group to bond to the nitrogen atom of a piperidine structure, and the glass transition temperature of the second layer is higher than or equal to 32° C.

22 Claims, 1 Drawing Sheet

(56) References Cited

U.S. PATENT DOCUMENTS

| | | | |
|---|---|---|---|
| 2011/0151269 A1 | 6/2011 | Hatta et al. | |
| 2011/0192678 A1 | 8/2011 | Matsuda et al. | |
| 2011/0261443 A1 | 10/2011 | Isojima et al. | |
| 2011/0287265 A1 | 11/2011 | Hasegawa | |
| 2012/0052310 A1 | 3/2012 | Keller et al. | |
| 2012/0067404 A1 | 3/2012 | Keller | |
| 2012/0160304 A1* | 6/2012 | Smith | B32B 17/10678 136/251 |
| 2012/0162752 A1 | 6/2012 | Kitano et al. | |
| 2012/0286722 A1 | 11/2012 | Iwamoto | |
| 2012/0288722 A1* | 11/2012 | Iwamoto | B32B 17/10761 428/437 |
| 2013/0040087 A1* | 2/2013 | Kazeto | C08K 5/09 428/36.5 |
| 2013/0074910 A1* | 3/2013 | Isoue | C08K 5/11 136/251 |
| 2013/0183507 A1 | 7/2013 | Matsuda et al. | |
| 2013/0189528 A1* | 7/2013 | Matsuda | B32B 27/306 428/442 |
| 2013/0323516 A1* | 12/2013 | Shimamoto | B32B 27/30 428/437 |
| 2013/0337247 A1* | 12/2013 | Kitano | B32B 17/10678 428/213 |
| 2014/0000977 A1 | 1/2014 | Matsuda et al. | |
| 2014/0349123 A1 | 11/2014 | Matsuda et al. | |
| 2014/0349124 A1 | 11/2014 | Shimamoto et al. | |
| 2016/0214352 A1 | 7/2016 | Yoshida et al. | |
| 2016/0214354 A1* | 7/2016 | Yoshida | B32B 27/306 |
| 2018/0001601 A1 | 1/2018 | Matsuda et al. | |

FOREIGN PATENT DOCUMENTS

| | | | | |
|---|---|---|---|---|
| CN | 102164872 A | 8/2011 | | |
| CN | 102355992 A | 2/2012 | | |
| CN | 102666420 A | 9/2012 | | |
| DE | 10 2004 000 026 A1 | 2/2006 | | |
| DE | 10 2009 001 629 A1 | 9/2010 | | |
| EP | 0 568 999 A1 | 11/1993 | | |
| EP | 1 845 070 A1 | 10/2007 | | |
| JP | 5-104687 A | 4/1993 | | |
| JP | 11-171604 A | 6/1999 | | |
| JP | 2005-526900 A | 9/2005 | | |
| JP | 2005-306326 A | 11/2005 | | |
| JP | 2006-240893 A | 9/2006 | | |
| JP | 2007-39300 A | 2/2007 | | |
| JP | 2011-64039 A | 3/2011 | | |
| JP | 2012-46748 A | 3/2012 | | |
| JP | 2012-131649 A | 7/2012 | | |
| JP | 5049593 B2 | 10/2012 | | |
| JP | 2012-251102 A | 12/2012 | | |
| JP | 2013-6725 A | 1/2013 | | |
| JP | 2013-10671 A | 1/2013 | | |
| JP | 5226153 B2 | 7/2013 | | |
| RU | 2 057 025 C1 | 3/1996 | | |
| RU | 2 418 755 C2 | 5/2011 | | |
| RU | 2012 111 220 A | 10/2013 | | |
| WO | WO-2004/018378 A2 | 3/2004 | | |
| WO | WO-2006/021531 A1 | 3/2006 | | |
| WO | WO-2010/047391 A1 | 4/2010 | | |
| WO | WO-2012/043816 A1 | 4/2012 | | |
| WO | WO-2012115198 A1 * | 8/2012 | | B32B 17/10633 |
| WO | WO-2013/042771 A1 | 3/2013 | | |

OTHER PUBLICATIONS

Written Opinion of the International Searching Authority (PCT/ISA/237) for Application No. PCT/JP2015/059782 dated Jun. 30, 2015 (English Translation dated Oct. 13, 2016).

International Search Report for the Application No. POT/JP2015/059781 dated May 19, 2015.

Written Opinion of the International Searching Authority (PCT/ISA/237) for Application No. PCT/JP2015/059781 dated May 19, 2015.

International Search Report for the Application No. PCT/JP2015/059782 dated Jun. 30, 2015.

Written Opinion of the International Searching Authority (PCT/ISA/237) for Application No. PCT/JP2015/059782 dated Jun. 30, 2015.

Russian Office Action for the Application No. 2016142224/03(067620) dated Jul. 26, 2018.

"Tinuvin® 622", Technical Information-Plastic Additives, BASF The Chemical Company, Mar. 2011, pp. 1-2.

Kojima, Fumitoshi, "The Expansion of Sumilizer G Series—The Excellent Additives for Polymer", Sumitomo Kagaku, 2004, vol. 2004-1, pp. 1-8.

Non-Final Office Action for the U.S. Appl. No. 15/123,670 from the United States Patent and Trademark Office dated Apr. 3, 2018.

Indian Examination Report for Application No. 201637029564 dated Jul. 19, 2019.

Indian Examination Report for Application No. 201637029794 dated Jul. 3, 2019.

Non-Final Office Action for the U.S. Appl. No. 15/123,670 from United States Patent and Trademark Office dated Nov. 8, 2019.

Final Office Action for the U.S. Appl. No. 15/123,670 from United States Patent and Trademark Office dated Mar. 2, 2020.

CA Korean Office Action for the Application No. 10-2016-7019912 dated Jun. 28, 2021.

* cited by examiner

INTERMEDIATE FILM FOR LAMINATED GLASS, AND LAMINATED GLASS

TECHNICAL FIELD

The present invention relates to an interlayer film for laminated glass used for laminated glass. Moreover, the present invention relates to laminated glass prepared with the interlayer film for laminated glass.

BACKGROUND ART

Since laminated glass generates only a small amount of scattering glass fragments even when subjected to external impact and broken, laminated glass is excellent in safety. As such, the laminated glass is widely used for automobiles, railway vehicles, aircraft, ships, buildings and the like. The laminated glass is produced by sandwiching an interlayer film for laminated glass between a pair of glass plates.

As an example of the interlayer film for laminated glass, the following Patent Document 1 discloses an interlayer film having a low tendency to turn yellow, having high transmittance for UV-A rays and visible light, and having low transmittance for UV-B rays. This interlayer film includes a polyvinyl acetal, a plasticizer and an oxanilide-based compound as a UV absorber. Moreover, in Patent Document 1, a technique for allowing a HAS/HALS/NOR-HALS type non-aromatic light stabilizer to be included in the interlayer film is described.

The following Patent Document 2 discloses an interlayer film which is high in ultraviolet ray blocking characteristics and is capable of maintaining the optical quality over a long period of time. This interlayer film includes a polymer layer. The polymer layer includes a tungsten oxide reagent and at least one kind among a molecule having a benzotriazole group and a polyvalent metal salt.

The following Patent Document 3 discloses an interlayer film with which the sound insulating properties in a high frequency area of laminated glass can be heightened over a wide temperature range. This interlayer film is provided with a first layer which contains a polyvinyl acetal resin and a plasticizer, a second layer which is layered on a first surface of the first layer and contains a polyvinyl acetal resin and a plasticizer, and a third layer which is layered on a second surface opposite to the first surface of the first layer and contains a polyvinyl acetal resin and a plasticizer. In this interlayer film, the content of the hydroxyl group of the polyvinyl acetal resin contained in the first layer is lower than the content of each hydroxyl group of the polyvinyl acetal resins contained in the second and third layers, and the ratio of the thickness of the first layer to the total thickness of the second layer and the third layer is less than or equal to 0.14. Moreover, in Patent Document 3, a technique capable of obtaining laminated glass in which the generation of foaming and the growth of bubbles can be suppressed is described.

RELATED ART DOCUMENT

Patent Document

Patent Document 1: US 2012/0052310 A1
Patent Document 2: US 2009/0035583 A1
Patent Document 3: WO 2012/043816 A1

SUMMARY OF THE INVENTION

Problems to be Solved by the Invention

At the end part of the sheet of laminated glass prepared with a conventional interlayer film, a gap is sometimes generated. In particular, this gap is easily generated when light, heat and the like are given to the sheet of laminated glass. This gap is a recess portion formed by the omission of the interlayer film at the end part of the sheet of laminated glass. This gap is different from a foamed product generated due to the foaming as described in Patent Document 3.

When a gap is generated at the end part of the sheet of laminated glass, the appearance of the sheet of laminated glass is deteriorated and the adhesive force between the interlayer film and a glass plate or the like is lowered.

Moreover, when a sheet of laminated glass is prepared with a conventional interlayer film, the yellow index (YI) value measured at the end part of the sheet of laminated glass is sometimes increased.

An object of the present invention is to provide an interlayer film for laminated glass making a gap difficult to be generated at an end part of the sheet of laminated glass and enabling an increase in the YI value measured at the end part of the sheet of laminated glass to be suppressed.

Means for Solving the Problems

According to a broad aspect of the present invention, there is provided an interlayer film for laminated glass including a first layer which contains a polyvinyl acetal resin and a plasticizer and a second layer which is arranged on a first surface side of the first layer and contains a polyvinyl acetal resin and a plasticizer, the first layer further containing a hindered amine light stabilizer having an alkyl group bonded to the nitrogen atom of a piperidine structure or an alkoxy group bonded to the nitrogen atom of a piperidine structure, the second layer having a glass transition temperature of higher than or equal to 32° C.

In a specific aspect of the interlayer film for laminated glass according to the present invention, at least one first metal atom selected from the group consisting of an alkaline earth metal, zinc and aluminum is included in the interlayer film, an alkali metal is not included or is included in the interlayer film, and the content of the first metal atom in the interlayer film is less than or equal to 150 ppm.

In a specific aspect of the interlayer film for laminated glass according to the present invention, the content of the plasticizer contained in the first layer relative to 100 parts by weight of the polyvinyl acetal resin contained in the first layer is greater than the content of the plasticizer contained in the second layer relative to 100 parts by weight of the polyvinyl acetal resin contained in the second layer.

In a specific aspect of the interlayer film for laminated glass according to the present invention, the polyvinyl acetal resin contained in the first layer is obtained by acetalizing a polyvinyl alcohol with an average polymerization degree of greater than or equal to 1500.

In a specific aspect of the interlayer film for laminated glass according to the present invention, the acetylation degree of the polyvinyl acetal resin contained in the first layer is greater than or equal to 0.1% by mole and less than or equal to 25% by mole, and the content of the hydroxyl group of the polyvinyl acetal resin contained in the first layer is greater than or equal to 20% by mole and less than 30% by mole.

In a specific aspect of the interlayer film for laminated glass according to the present invention, the glass transition temperature of the first layer is lower than or equal to 20° C.

In a specific aspect of the interlayer film for laminated glass according to the present invention, the first layer contains an oxidation inhibitor having the molecular weight of greater than or equal to 250 and including a phenol skeleton.

In a specific aspect of the interlayer film for laminated glass according to the present invention, the molecular weight of the hindered amine light stabilizer is less than or equal to 1000.

In a specific aspect of the interlayer film for laminated glass according to the present invention, the interlayer film for laminated glass further includes a third layer which is arranged on a second surface side opposite to the first surface of the first layer and contains a polyvinyl acetal resin and a plasticizer.

In a specific aspect of the interlayer film for laminated glass according to the present invention, the glass transition temperature of the third layer is higher than or equal to 32° C.

In a specific aspect of the interlayer film for laminated glass according to the present invention, the interlayer film for laminated glass is used for obtaining laminated glass of an automobile.

According to a broad aspect of the present invention, there is provided laminated glass including a first laminated glass member, a second laminated glass member and an interlayer film for laminated glass described above, wherein the interlayer film for laminated glass is arranged between the first laminated glass member and the second laminated glass member.

Effect of the Invention

Since the interlayer film for laminated glass according to the present invention includes a first layer which contains a polyvinyl acetal resin and a plasticizer and a second layer which is arranged on a first surface side of the first layer and contains a polyvinyl acetal resin and a plasticizer, furthermore, the first layer further contains a hindered amine light stabilizer allowing an alkyl group bonded to the nitrogen atom of a piperidine structure or an alkoxy group bonded to the nitrogen atom of a piperidine structure, and the second layer has a glass transition temperature of higher than or equal to 32° C., a gap is made difficult to be generated at an end part of the sheet of laminated glass prepared with the interlayer film for laminated glass according to the present invention and an increase in the YI value measured at the end part of the sheet of laminated glass can be suppressed.

With regard to the interlayer film for laminated glass according to the present invention, since the first layer contains a hindered amine light stabilizer having an alkyl group bonded to the nitrogen atom of a piperidine structure or an alkoxy group bonded to the nitrogen atom of a piperidine structure, a gap is made difficult to be generated at an end part of the sheet of laminated glass and an increase in the YI value measured at the end part of the sheet of laminated glass can be suppressed. Furthermore, with regard to the interlayer film for laminated glass according to the present invention, since the glass transition temperature of the second layer is higher than or equal to 32° C., a gap is made difficult to be generated at an end part of the sheet of laminated glass and an increase in the YI value measured at the end part of the sheet of laminated glass can be suppressed.

MODE(S) FOR CARRYING OUT THE INVENTION

Hereinafter, the present invention will be elucidated by describing specific embodiments and examples of the present invention with reference to the drawings.

Figure 1:
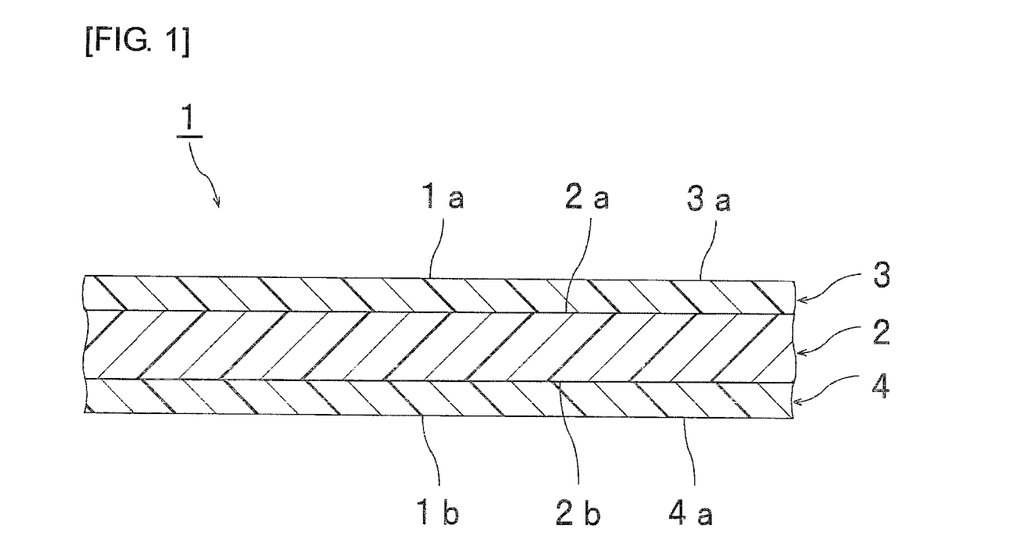
FIG. 1 is a partially cut-away sectional view schematically showing an interlayer film for laminated glass in accordance with one embodiment of the present invention.

FIG. 1 shows an interlayer film for laminated glass in accordance with one embodiment of the present invention schematically represented as a partially cut-away sectional view.

An interlayer film 1 shown in FIG. 1 is a multi-layered interlayer film having a two or more-layer structure. The interlayer film 1 is used for obtaining laminated glass. The interlayer film 1 has a two or more-layered structure. The interlayer film 1 is an interlayer film for laminated glass. The interlayer film 1 is provided with a first layer 2, a second layer 3 arranged on a first surface 2a side of the first layer 2, and a third layer 4 arranged on a second surface 2b side opposite to the first surface 2a of the first layer 2. The second layer 3 is layered on the first surface 2a of the first layer 2. The third layer 4 is layered on the second surface 2b of the first layer 2. The first layer 2 is an intermediate layer. For example, the second layer 3 and the third layer 4 are protective layers and are surface layers in the present embodiment. The first layer 2 is arranged between the second layer 3 and the third layer 4 to be sandwiched. Accordingly, the interlayer film 1 has a multilayer structure in which the second layer 3, the first layer 2 and the third layer 4 are layered in this order.

It is preferred that a surface 3a at a side opposite to the first layer 2 side of the second layer 3 be a surface on which a laminated glass member is layered. It is preferred that a surface 4a at a side opposite to the first layer 2 side of the third layer 4 be a surface on which a laminated glass member is layered.

In this connection, other layers may be arranged between the first layer 2 and the second layer 3 and between the first layer 2 and the third layer 4, respectively. It is preferred that each of the second layer 3 and the third layer 4 be directly layered on the first layer 2. Examples of another layer include a layer containing a thermoplastic resin such as a polyvinyl acetal resin and a layer containing polyethylene terephthalate and the like.

Each of the first layer 2 and the second layer 3 contains a polyvinyl acetal resin and a plasticizer. The first layer 2 contains a hindered amine light stabilizer. The hindered amine light stabilizer has a piperidine structure. The hindered amine light stabilizer contained in the first layer 2 is a hindered amine light stabilizer allowing an alkyl group bonded to the nitrogen atom of a piperidine structure or an alkoxy group bonded to the nitrogen atom of a piperidine structure. The glass transition temperature of the second layer 3 is higher than or equal to 32° C.

Since the interlayer film 1 is provided with the above-described configuration, a gap is made difficult to be generated at an end part of the sheet of laminated glass prepared with the interlayer film 1 and an increase in the YI value measured at the end part of the sheet of laminated glass can be suppressed. With regard to the interlayer film 1, even when a sheet of laminated glass prepared with the interlayer film 1 is irradiated with light for a long period of time and the sheet of laminated glass is allowed to stand at a high temperature for a long period of time, it is possible to make a gap difficult to be generated at an end part of the sheet of laminated glass. Furthermore, even when a sheet of laminated glass prepared with the interlayer films 1 is allowed to stand at a high temperature for a long period of time, an increase in the YI value can be suppressed. In this connection, the gap is a recess portion formed by the omission of the interlayer film toward the inside thereof at the end part of the sheet of laminated glass. For example, the interlayer film is inwardly retracted, and the recess portion is formed.

X) With regard to the interlayer film 1, since the first layer 2 contains a hindered amine light stabilizer an alkyl group bonded to the nitrogen atom of a piperidine structure or an alkoxy group bonded to the nitrogen atom of a piperidine structure, a gap is made difficult to be generated at an end part of the sheet of laminated glass and an increase in the YI value measured at the end part of the sheet of laminated glass can be suppressed. Furthermore, Y) with regard to the interlayer film 1, since the glass transition temperature of the second layer 3 is higher than or equal to 32° C., a gap is made difficult to be generated at an end part of the sheet of laminated glass and enables an increase in the YI value measured at the end part of the sheet of laminated glass can be suppressed. By virtue of the above-mentioned configuration of X) and the above-mentioned configuration of Y), an effect of making a gap difficult to be generated at an end part of the sheet of laminated glass and an effect of enabling an increase in the YI value measured at the end part of the sheet of laminated glass to be suppressed are synergistically exerted. It has been found for the first time by the present inventors that such a combination of these effects is attained by virtue of the above-mentioned configuration of X) and the above-mentioned configuration of Y) and these effects are synergistically exerted by virtue of the above-mentioned configuration of X) and the above-mentioned configuration of Y).

With regard to the interlayer film 1, the second layer 3 and the third layer 4 each are layered on both faces of the first layer 2, respectively. The second layer needs only to be arranged on the first surface side of the first layer. The second layer is arranged on the first surface side of the first layer, and the third layer does not need to be arranged on the second surface side of the first layer. In this context, the second layer is arranged on the first surface side of the first layer, and it is preferred that the third layer be arranged on the second surface side of the first layer. By allowing the third layer to be arranged on the second surface side of the first layer, the handling properties of the interlayer film and the penetration resistance of laminated glass are further enhanced. Moreover, a gap is further made difficult to be generated at an end part of the sheet of laminated glass and an increase in the YI value measured at the end part of the sheet of laminated glass can be further suppressed. Furthermore, at the surfaces of both sides of the interlayer film, the adhesivity to a laminated glass member and the like can be adjusted. In this connection, in the case where the third layer is absent, the adhesivity of an outer surface of the second layer of the interlayer film to a laminated glass member can be adjusted.

Moreover, from the viewpoint of further enhancing the penetration resistance of laminated glass prepared with the interlayer film, it is preferred that the third layer contain a polyvinyl acetal resin, it is preferred that the third layer contain a plasticizer and it is preferred that the third layer contain a polyvinyl acetal resin and a plasticizer. From the viewpoints of effectively making a gap difficult to be generated at an end part of the sheet of laminated glass and effectively suppressing an increase in the YI value measured at the end part of the sheet of laminated glass, it is preferred that the glass transition temperature of the third layer be higher than or equal to 32° C., and accordingly, it is preferred that the glass transition temperatures of both the second layer and the third layer be higher than or equal to 32° C. It is preferred that the interlayer film be provided with the second layer as a surface layer of the interlayer film. It is preferred that the interlayer film be provided with the third layer as a surface layer of the interlayer film.

From the viewpoints of effectively making a gap difficult to be generated at an end part of the sheet of laminated glass and effectively suppressing an increase in the YI value measured at the end part of the sheet of laminated glass, the glass transition temperature of the second layer is preferably higher than or equal to 33° C. and more preferably higher than or equal to 35° C. From the viewpoints of effectively making a gap difficult to be generated at an end part of the sheet of laminated glass and effectively suppressing an increase in the YI value measured at the end part of the sheet of laminated glass, the glass transition temperature of the third layer is preferably higher than or equal to 32° C., more preferably higher than or equal to 33° C. and further preferably higher than or equal to 35° C. The upper limit of the glass transition temperature of each of the second layer and the third layer is not particularly limited. From the viewpoint of further heightening the sound insulating properties of the interlayer film, the glass transition temperature of each of the second layer and the third layer may be lower than or equal to 60° C.

Hereinafter, the details of the first layer, the second layer and the third layer which constitute the interlayer film for laminated glass according to the present invention, and the details of each ingredient contained in the first layer, the second layer and the third layer will be described.

(Polyvinyl Acetal Resin)

The first layer contains a polyvinyl acetal resin (hereinafter, sometimes described as a polyvinyl acetal resin (1)). The second layer contains a polyvinyl acetal resin (hereinafter, sometimes described as a polyvinyl acetal resin (2)). It is preferred that the third layer contain a polyvinyl acetal resin (hereinafter, sometimes described as a polyvinyl acetal resin (3)). The polyvinyl acetal resin (1), the polyvinyl acetal resin (2) and the polyvinyl acetal resin (3) may be the same as or different from one another. One kind of each of the polyvinyl acetal resin (1), the polyvinyl acetal resin (2) and the polyvinyl acetal resin (3) may be used alone, and two or more kinds thereof may be used in combination.

For example, the polyvinyl acetal resin can be produced by acetalizing polyvinyl alcohol with an aldehyde. For example, the polyvinyl alcohol can be obtained by saponifying polyvinyl acetate. The saponification degree of the polyvinyl alcohol generally lies within the range of 70 to 99.9% by mole.

The average polymerization degree of the polyvinyl alcohol is preferably greater than or equal to 200, more preferably greater than or equal to 500, still more preferably greater than or equal to 1500, further preferably greater than or equal to 1600, especially preferably greater than or equal to 2600, most preferably greater than or equal to 2700, preferably less than or equal to 5000, more preferably less than or equal to 4000 and further preferably less than or equal to 3500. When the average polymerization degree is greater than or equal to the above lower limit, the penetration resistance of laminated glass is further enhanced. When the average polymerization degree is less than or equal to the above upper limit, formation of an interlayer film is facilitated. In particular, when the average polymerization degree of the polyvinyl alcohol is greater than or equal to 1500, it is possible to prevent the appearance of a sheet of laminated glass from being deteriorated by poor degassing.

The average polymerization degree of the polyvinyl alcohol is determined by a method in accordance with JIS K6726 "Testing methods for polyvinyl alcohol".

The number of carbon atoms of the acetal group contained in the polyvinyl acetal resin is not particularly limited. The aldehyde used at the time of producing the polyvinyl acetal resin is not particularly limited. It is preferred that the number of carbon atoms of the acetal group in the polyvinyl acetal resin lie within the range of 3 to 5, and it is preferred that the number of carbon atoms of the acetal group be 3 or 4. When the number of carbon atoms of the acetal group in the polyvinyl acetal resin is greater than or equal to 3, the glass transition temperature of the interlayer film is sufficiently lowered.

The aldehyde is not particularly limited. In general, an aldehyde with 1 to 10 carbon atoms is suitably used as the above-mentioned aldehyde. Examples of the aldehyde with 1 to 10 carbon atoms include formaldehyde, acetaldehyde, propionaldehyde, n-butyraldehyde, isobutyraldehyde, n-valeraldehyde, 2-ethylbutyraldehyde, n-hexylaldehyde, n-octylaldehyde, n-nonylaldehyde, n-decylaldehyde, benzaldehyde, and the like. Of these, propionaldehyde, n-butyraldehyde, isobutyraldehyde, n-hexylaldehyde or n-valeraldehyde is preferred, propionaldehyde, n-butyraldehyde or isobutyraldehyde is more preferred, and n-butyraldehyde is further preferred.

One kind of the aldehyde may be used alone, and two or more kinds thereof may be used in combination.

The content of the hydroxyl group (the amount of hydroxyl groups) of the polyvinyl acetal resin (1) is preferably greater than or equal to 17% by mole, more preferably greater than or equal to 20% by mole, further preferably greater than or equal to 22% by mole, preferably less than or equal to 30% by mole, more preferably less than 27% by mole and further preferably less than or equal to 25% by mole. When the content of the hydroxyl group is greater than or equal to the above lower limit, the adhesive force of the interlayer film is further heightened. In particular, when the content of the hydroxyl group of the polyvinyl acetal resin (1) is greater than or equal to 20% by mole, the resin is high in reaction efficiency and is excellent in productivity, and moreover, when less than 27% by mole, the sound insulating properties of laminated glass are further heightened. Moreover, when the content of the hydroxyl group is less than or equal to the above upper limit, the flexibility of the interlayer film is enhanced and the handling of the interlayer film is facilitated.

The content of the hydroxyl group of each of the polyvinyl acetal resin (2) and the polyvinyl acetal resin (3) is preferably greater than or equal to 25% by mole, more preferably greater than or equal to 28% by mole, preferably less than or equal to 35% by mole and more preferably less than or equal to 32% by mole. When the content of the hydroxyl group is greater than or equal to the above lower limit, the adhesive force of the interlayer film is further heightened. Moreover, when the content of the hydroxyl group is less than or equal to the above upper limit, the flexibility of the interlayer film is enhanced and the handling of the interlayer film is facilitated.

The content of the hydroxyl group of the polyvinyl acetal resin is a mole fraction, represented in percentage, obtained dividing the amount of ethylene groups to which the hydroxyl group is bonded by the total amount of ethylene groups in the main chain. For example, the amount of ethylene groups to which the hydroxyl group is bonded can be measured in accordance with JIS K6726 "Testing methods for polyvinyl alcohol" to be determined.

The acetylation degree (the amount of acetyl groups) of the polyvinyl acetal resin (1) is preferably greater than or equal to 0.01% by mole, more preferably greater than or equal to 0.1% by mole, still more preferably greater than or equal to 7% by mole, further preferably greater than or equal to 9% by mole, preferably less than or equal to 30% by mole, more preferably less than or equal to 25% by mole and further preferably less than or equal to 15% by mole. When the acetylation degree is greater than or equal to the above lower limit, the compatibility between the polyvinyl acetal resin and a plasticizer is heightened. When the acetylation degree is less than or equal to the above upper limit, with regard to the interlayer film and laminated glass, the moisture resistance thereof is enhanced. In particular, when the acetylation degree of the polyvinyl acetal resin (1) is greater than or equal to 0.1% by mole and less than or equal to 25% by mole, the laminated glass is further excellent in penetration resistance.

The acetylation degree of each of the polyvinyl acetal resin (2) and the polyvinyl acetal resin (3) is preferably greater than or equal to 0.01% by mole, more preferably greater than or equal to 0.5% by mole, preferably less than or equal to 10% by mole and more preferably less than or equal to 2% by mole. When the acetylation degree is greater than or equal to the above lower limit, the compatibility between the polyvinyl acetal resin and a plasticizer is heightened. When the acetylation degree is less than or equal to the above upper limit, with regard to the interlayer film and laminated glass, the moisture resistance thereof is enhanced.

The acetylation degree is a mole fraction, represented in percentage, obtained by dividing a value obtained by subtracting the amount of ethylene groups to which the acetal group is bonded and the amount of ethylene groups to which the hydroxyl group is bonded from the total amount of ethylene groups in the main chain by the total amount of ethylene groups in the main chain. For example, the amount of ethylene groups to which the acetal group is bonded can be measured in accordance with JIS K6728 "Testing methods for polyvinyl butyral".

The acetalization degree of the polyvinyl acetal resin (1) (the butyralization degree in the case of a polyvinyl butyral resin) is preferably greater than or equal to 47% by mole, more preferably greater than or equal to 60% by mole, preferably less than or equal to 80% by mole and more preferably less than or equal to 70% by mole. When the acetalization degree is greater than or equal to the above lower limit, the compatibility between the polyvinyl acetal resin and a plasticizer is heightened. When the acetalization degree is less than or equal to the above upper limit, the reaction time required for producing the polyvinyl acetal resin is shortened.

The acetalization degree of each of the polyvinyl acetal resin (2) and the polyvinyl acetal resin (3) (the butyralization degree in the case of a polyvinyl butyral resin) is preferably greater than or equal to 55% by mole, more preferably greater than or equal to 67% by mole, preferably less than or equal to 75% by mole and more preferably less than or equal to 71% by mole. When the acetalization degree is greater than or equal to the above lower limit, the compatibility between the polyvinyl acetal resin and a plasticizer is heightened. When the acetalization degree is less than or equal to the above upper limit, the reaction time required for producing the polyvinyl acetal resin is shortened.

The acetalization degree is a value expressing the mole fraction determined by dividing the amount of ethylene groups to which the acetal group is bonded by the total amount of ethylene groups in the main chain in terms of percentage. The acetalization degree can be calculated by a method in accordance with JIS K6728 "Testing methods for polyvinyl butyral".

In this connection, it is preferred that the content of the hydroxyl group (the amount of hydroxyl groups), the acetalization degree (the butyralization degree) and the acetylation degree be calculated from the results measured by a method in accordance with JIS K6728 "Testing methods for polyvinyl butyral". In this context, a method in accordance with ASTM D1396-92 and JIS K6728 may be used. In the case where the polyvinyl acetal resin is a polyvinyl butyral resin, the content of the hydroxyl group (the amount of hydroxyl groups), the acetalization degree (the butyralization degree) and the acetylation degree can be calculated from the results measured by a method in accordance with JIS K6728 "Testing methods for polyvinyl butyral".

From the viewpoint of further improving the penetration resistance of laminated glass, it is preferred that the polyvinyl acetal resin (1) be a polyvinyl acetal resin (A) with an acetylation degree (a) less than or equal to 8% by mole and an acetalization degree (a) greater than or equal to 70% by mole or a polyvinyl acetal resin (B) with an acetylation degree (b) greater than 8% by mole. The polyvinyl acetal resin (1) may be the polyvinyl acetal resin (A) and may be the polyvinyl acetal resin (B).

The acetylation degree (a) of the polyvinyl acetal resin (A) is less than or equal to 8% by mole, preferably less than or equal to 7.5% by mole, more preferably less than or equal to 7% by mole, further preferably less than or equal to 6.5% by mole, especially preferably less than or equal to 5% by mole, preferably greater than or equal to 0.1% by mole, more preferably greater than or equal to 0.5% by mole, further preferably greater than or equal to 0.8% by mole and especially preferably greater than or equal to 1% by mole. When the acetylation degree (a) is less than or equal to the above upper limit and greater than or equal to the above lower limit, the transfer of a plasticizer can be easily controlled and the sound insulating properties of laminated glass are further heightened.

The acetalization degree (a) of the polyvinyl acetal resin (A) is greater than or equal 70% by mole, preferably greater than or equal to 70.5% by mole, more preferably greater than or equal to 71% by mole, further preferably greater than or equal to 71.5% by mole, especially preferably greater than or equal to 72% by mole, preferably less than or equal to 85% by mole, more preferably less than or equal to 83% by mole, further preferably less than or equal to 81% by mole and especially preferably less than or equal to 79% by mole. When the acetalization degree (a) is greater than or equal to the above lower limit, the sound insulating properties of laminated glass are further heightened. When the acetalization degree (a) is less than or equal to the above upper limit, the reaction time required for producing the polyvinyl acetal resin (A) can be shortened.

The content ratio (a) of the hydroxyl group of the polyvinyl acetal resin (A) is preferably greater than or equal to 18% by mole, more preferably greater than or equal to 19% by mole, further preferably greater than or equal to 20% by mole, especially preferably greater than or equal to 21% by mole, preferably less than or equal to 31% by mole, more preferably less than or equal to 30% by mole, further preferably less than or equal to 29% by mole and especially preferably less than or equal to 28% by mole. When the content ratio (a) of the hydroxyl group is greater than or equal to the above lower limit, the adhesive force of the first layer is further heightened. When the content ratio (a) of the hydroxyl group is less than or equal to the above upper limit, the sound insulating properties of laminated glass are further heightened.

The acetylation degree (b) of the polyvinyl acetal resin (B) is greater than 8% by mole, preferably greater than or equal to 9% by mole, more preferably greater than or equal to 9.5% by mole, further preferably greater than or equal to 10% by mole, especially preferably greater than or equal to 10.5% by mole, preferably less than or equal to 30% by mole, more preferably less than or equal to 28% by mole, further preferably less than or equal to 26% by mole and especially preferably less than or equal to 24% by mole. When the acetylation degree (b) is greater than or equal to the above lower limit, the sound insulating properties of laminated glass are further heightened. When the acetylation degree (b) is less than or equal to the above upper limit, the reaction time required for producing the polyvinyl acetal resin (B) can be shortened.

The acetalization degree (b) of the polyvinyl acetal resin (B) is preferably greater than or equal to 50% by mole, more preferably greater than or equal to 53% by mole, further preferably greater than or equal to 55% by mole, especially preferably greater than or equal to 60% by mole, preferably less than or equal to 80% by mole, more preferably less than or equal to 78% by mole, further preferably less than or equal to 76% by mole and especially preferably less than or equal to 74% by mole. When the acetalization degree (b) is greater than or equal to the above lower limit, the sound insulating properties of laminated glass are further heightened. When the acetalization degree (b) is less than or equal to the above upper limit, the reaction time required for producing the polyvinyl acetal resin (B) can be shortened.

The content ratio (b) of the hydroxyl group of the polyvinyl acetal resin (B) is preferably greater than or equal to 18% by mole, more preferably greater than or equal to 19% by mole, further preferably greater than or equal to 20% by mole, especially preferably greater than or equal to 21% by mole, preferably less than or equal to 31% by mole, more preferably less than or equal to 30% by mole, further preferably less than or equal to 29% by mole and especially preferably less than or equal to 28% by mole. When the content ratio (b) of the hydroxyl group is greater than or equal to the above lower limit, the adhesive force of the first layer is further heightened. When the content ratio (b) of the hydroxyl group is less than or equal to the above upper limit, the sound insulating properties of laminated glass are further heightened.

It is preferred that each of the polyvinyl acetal resin (A) and the polyvinyl acetal resin (B) be a polyvinyl butyral resin.

(Plasticizer)

The first layer contains a plasticizer (hereinafter, sometimes described as a plasticizer (1)). The second layer contains a plasticizer (hereinafter, sometimes described as a plasticizer (2)). It is preferred that the third layer contain a plasticizer (hereinafter, sometimes described as a plasticizer (3)). By using a polyvinyl acetal resin and a plasticizer together, the adhesive force of a layer containing the polyvinyl acetal resin and the plasticizer to a laminated glass member or another layer is moderately heightened. The plasticizer is not particularly limited. The plasticizer (1), the plasticizer (2) and the plasticizer (3) may be the same as or different from one another. One kind of the plasticizer may be used alone, and two or more kinds thereof may be used in combination.

Examples of the plasticizer include organic ester plasticizers such as a monobasic organic acid ester and a polybasic organic acid ester, organic phosphate plasticizers such as an organic phosphate plasticizer and an organic phosphite plasticizer, and the like. Of these, organic ester plasticizers are preferred. It is preferred that the plasticizer be a liquid plasticizer.

Examples of the monobasic organic acid ester include a glycol ester obtained by the reaction of a glycol with a monobasic organic acid, and the like. Examples of the glycol include triethylene glycol, tetraethylene glycol, tripropylene glycol, and the like. Examples of the monobasic organic acid include butyric acid, isobutyric acid, caproic acid, 2-ethylbutyric acid, hepthylic acid, n-octylic acid, 2-ethylhexanoic acid, n-nonylic acid, decylic acid, and the like.

Examples of the polybasic organic acid ester include an ester compound of a polybasic organic acid and an alcohol having a linear or branched structure of 4 to 8 carbon atoms, and the like. Examples of the polybasic organic acid include adipic acid, sebacic acid, azelaic acid and the like.

Examples of the organic ester plasticizer include triethylene glycol di-2-ethylpropanoate, triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, dibutyl sebacate, dioctyl azelate, dibutyl carbitol adipate, ethylene glycol di-2-ethylbutyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicaprylate, dihexyl adipate, dioctyl adipate, hexyl cyclohexyl adipate, a mixture of heptyl adipate and nonyl adipate, diisononyl adipate, diisodecyl adipate, heptyl nonyl adipate, dibutyl sebacate, oil-modified sebacic acid alkyd, a mixture of a phosphoric acid ester and an adipic acid ester, and the like. Organic ester plasticizers other than these may be used. Other adipic acid esters other than the above-described adipic acid esters may be used.

Examples of the organic phosphate plasticizer include tributoxyethyl phosphate, isodecyl phenyl phosphate, triisopropyl phosphate and the like.

It is preferred that the plasticizer be a diester plasticizer represented by the following formula (1).

[Chemical 1]

Formula (1)

In the foregoing formula (1), R1 and R2 each represent an organic group with 2 to 10 carbon atoms, R3 represents an ethylene group, an isopropylene group or an n-propylene group, and p represents an integer of 3 to 10. It is preferred that R1 and R2 in the foregoing formula (1) each be an organic group with 5 to 10 carbon atoms, and it is more preferred that R1 and R2 each be an organic group with 6 to 10 carbon atoms.

It is preferred that the plasticizer include triethylene glycol di-2-ethylhexanoate (3GO), triethylene glycol di-2-ethylbutyrate (3GH) or triethylene glycol di-2-ethylpropanoate, it is more preferred that the plasticizer include triethylene glycol di-2-ethylhexanoate or triethylene glycol di-2-ethylbutyrate, and it is further preferred that the plasticizer include triethylene glycol di-2-ethylhexanoate.

The content of the plasticizer (1) relative to 100 parts by weight of the polyvinyl acetal resin (1) (hereinafter, sometimes described as the content (1)) is preferably greater than or equal to 40 parts by weight, more preferably greater than or equal to 55 parts by weight, preferably less than or equal to 90 parts by weight and more preferably less than or equal to 85 parts by weight. When the content (1) is greater than or equal to the above lower limit, the flexibility of the interlayer film is enhanced and the handling of the interlayer film is facilitated. When the content (1) is less than or equal to the above upper limit, the transparency of the interlayer film is further enhanced.

Each of the content of the plasticizer (2) relative to 100 parts by weight of the polyvinyl acetal resin (2) (hereinafter, sometimes described as the content (2)) and the content of the plasticizer (3) relative to 100 parts by weight of the polyvinyl acetal resin (3) (hereinafter, sometimes described as the content (3)) is preferably greater than or equal to 30 parts by weight, more preferably greater than or equal to 35 parts by weight, preferably less than or equal to 44 parts by weight and more preferably less than or equal to 42 parts by weight. When each of the content (2) and the content (3) is greater than or equal to the above lower limit, the flexibility of the interlayer film is enhanced and the handling of the interlayer film is facilitated. When each of the content (2) and the content (3) is less than or equal to the above upper limit, the penetration resistance of laminated glass is further enhanced.

From the viewpoint of further making a gap difficult to be generated at an end part of the sheet of laminated glass, it is preferred that the content (1) be greater than the content (2) and it is preferred that the content (1) be greater than the content (3).

From the viewpoint of further enhancing the penetration resistance of laminated glass, each of the absolute value of the difference between the content (1) and the content (2) and the absolute value of the difference between the content (1) and the content (3) is preferably greater than or equal to 10 parts by weight and more preferably greater than or equal to 20 parts by weight. Each of the absolute value of the difference between the content (1) and the content (2) and the absolute value of the difference between the content (1) and the content (3) is preferably less than or equal to 50 parts by weight.

(Hindered Amine Light Stabilizer)

The first layer contains a hindered amine light stabilizer. The hindered amine light stabilizer contained in the first layer is a hindered amine light stabilizer having an alkyl group bonded to the nitrogen atom of a piperidine structure or an alkoxy group bonded to the nitrogen atom of a piperidine structure (hereinafter, sometimes described as a hindered amine light stabilizer (X)). Each of the second layer and the third layer may contain a hindered amine light stabilizer, and may not contain a hindered amine light stabilizer. In the case where the second layer and the third layer contain a hindered amine light stabilizer, it is preferred that the hindered amine light stabilizer contained in the second layer and the third layer be a hindered amine light stabilizer (X) having an alkyl group bonded to the nitrogen atom of a piperidine structure or an alkoxy group bonded to the nitrogen atom of a piperidine structure. One kind of the hindered amine light stabilizer (X) may be used alone, and two or more kinds thereof may be used in combination.

It is preferred that the hindered amine light stabilizer (X) be a hindered amine light stabilizer having an alkyl group bonded to the nitrogen atom of a piperidine structure, and it is also preferred that the hindered amine light stabilizer (X) be a hindered amine light stabilizer having an alkoxy group bonded to the nitrogen atom of a piperidine structure.

Examples of the hindered amine light stabilizer having an alkyl group bonded to the nitrogen atom of a piperidine structure include TINUVIN 765, TINUVIN 622SF, ADK STAB LA-52, and the like.

Examples of the hindered amine light stabilizer having an alkoxy group bonded to the nitrogen atom of a piperidine structure include TINUVIN XT-850FF, TINUVIN XT-855FF, ADK STAB LA-81, and the like.

From the viewpoints of further making a gap difficult to be generated at an end part of the sheet of laminated glass and further suppressing an increase in the YI value measured at the end part of the sheet of laminated glass, the molecular weight of the hindered amine light stabilizer (X) is preferably less than or equal to 2000, more preferably less than or equal to 1000 and further preferably less than or equal to 700.

In 100% by weight of the first layer, the content of the hindered amine light stabilizer (X) is preferably greater than or equal to 0.01% by weight, more preferably greater than or equal to 0.05% by weight, preferably less than or equal to 0.5% by weight and more preferably less than or equal to 0.3% by weight. When the content of the hindered amine light stabilizer (X) is greater than or equal to the above lower limit and less than or equal to the above upper limit, a gap is further made difficult to be generated at an end part of the sheet of laminated glass and an increase in the YI value measured at the end part of the sheet of laminated glass can be further suppressed.

The first layer may contain a hindered amine light stabilizer other than the hindered amine light stabilizer (X). However, it is good to make the content of a hindered amine light stabilizer other than the hindered amine light stabilizer (X) in the first layer smaller, and it is preferred that the first layer not contain a hindered amine light stabilizer other than the hindered amine light stabilizer (X). In 100% by weight of the first layer, the content of a hindered amine light stabilizer other than the hindered amine light stabilizer (X) is preferably less than or equal to 0.2% by weight and more preferably less than or equal to 0.1% by weight.

(Oxidation Inhibitor)

It is preferred that each of the first layer, the second layer and the third layer contain an oxidation inhibitor. One kind of the oxidation inhibitor may be used alone, and two or more kinds thereof may be used in combination.

Examples of the oxidation inhibitor include an oxidation inhibitor including a phenol skeleton, an oxidation inhibitor containing sulfur, an oxidation inhibitor containing phosphorus, and the like.

From the viewpoint of further suppressing an increase in the YI value measured at the end part of the sheet of laminated glass, it is preferred that the oxidation inhibitor be an oxidation inhibitor including a phenol skeleton or an oxidation inhibitor containing phosphorus, and it is more preferred that the oxidation inhibitor be an oxidation inhibitor including a phenol skeleton.

Examples of the oxidation inhibitor including a phenol skeleton include 2,6-di-t-butyl-p-cresol (BHT), butylated hydroxyanisole (BHA), 2,6-di-t-butyl-4-ethylphenol, stearyl-β-(3,5-di-t-butyl-4-hydroxyphenyl)propionate, 2,2'-methylenebis-(4-methyl-6-butylphenol), 2,2'-methylenebis-(4-ethyl-6-t-butylphenol), 4,4'-butylidene-bis-(3-methyl-6-t-butylphenol), 1,1,3-tris-(2-methyl-hydroxy-5-t-butylphenyl)butane, tetrakis[methylene-3-(3',5'-butyl-4-hydroxyphenyl)propionate]methane, 1,3,3-tris-(2-methyl-4-hydroxy-5-t-butylphenol)butane, 1,3,5-trimethyl-2,4,6-tris (3,5-di-t-butyl-4-hydroxybenzyl)benzene, bis(3,3'-t-butylphenol)butyric acid glycol ester, bis(3-t-butyl-4-hydroxy-5-methylbenzenepropanoic acid)ethylenebis (oxyethylene), and the like.

Examples of the oxidation inhibitor containing phosphorus include tridecyl phosphite, tris(tridecyl) phosphite, triphenyl phosphite, trinonylphenyl phosphite, bis(tridecyl) pentaerithritol diphosphite, bis(decyl)pentaerithritol diphosphite, tris(2,4-di-t-butylphenyl)phosphite, bis(2,4-di-t-butyl-6-methylphenyl)ethyl ester phosphorous acid, tris(2, 4-di-t-butylphenyl)phosphite, 2,2'-methylenebis(4,6-di-t-butyl-1-phenyloxy)(2-ethylhexyloxy)phosphorus, and the like.

From the viewpoint of further suppressing an increase in the YI value measured at the end part of the sheet of laminated glass, the molecular weight of the oxidation inhibitor is preferably greater than or equal to 200, more preferably greater than or equal to 300, further preferably greater than or equal to 500 and preferably less than or equal to 1500.

In 100% by weight of a layer containing the oxidation inhibitor, the content of the oxidation inhibitor is preferably greater than or equal to 0.1% by weight, preferably less than or equal to 2% by weight and more preferably less than or equal to 1.8% by weight. When the content of the oxidation inhibitor is greater than or equal to the above lower limit and less than or equal to the above upper limit, a gap is further made difficult to be generated at an end part of the sheet of laminated glass and an increase in the YI value measured at the end part of the sheet of laminated glass can be further suppressed.

(Metal/Metal Salt)

It is preferred that the interlayer film include at least one kind of the first metal atom selected from the group consisting of an alkali metal, zinc and aluminum. The interlayer film does not include or includes an alkaline earth metal. For example, in the case where the first layer is a surface layer, it is preferred that the first metal atom and the alkaline earth metal each be contained in the first layer. It is preferred that the first metal atom and the alkaline earth metal each be contained in the second layer. It is preferred that the first metal atom and the alkaline earth metal each be contained in the third layer. By the use of the first metal atom and the alkaline earth metal, controlling the adhesivity between a laminated glass member and the interlayer film or the adhesivity between respective layers in the interlayer film is facilitated. The first metal atom and the alkaline earth metal each may be in the state of being a metal salt (hereinafter, sometimes described as a metal salt (M)) to be blended.

It is preferred that the metal salt (M) contain at least one kind of metal selected from the group consisting of Li, Na, K, Rb, Cs, Mg, Ca, Sr and Ba. It is preferred that the interlayer film include at least one kind of metal among K and Mg.

Moreover, it is more preferred that the metal salt (M) be an alkali metal salt of an organic acid with 2 to 16 carbon atoms or an alkaline earth metal salt of an organic acid with 2 to 16 carbon atoms, and it is further preferred that the metal salt (M) be a magnesium carboxylate with 2 to 16 carbon atoms or a potassium carboxylate with 2 to 16 carbon atoms.

Although the magnesium carboxylate with 2 to 16 carbon atoms and the potassium carboxylate with 2 to 16 carbon atoms are not particularly limited, examples thereof include magnesium acetate, potassium acetate, magnesium propionate, potassium propionate, magnesium 2-ethylbutanoate, potassium 2-ethylbutanoate, magnesium 2-ethylhexanoate, potassium 2-ethylhexanoate, and the like.

In the case where the interlayer film includes the first metal atom, each of the content of the first metal atom in the interlayer film, the content of the alkali metal in the first layer, the content of the first metal atom in the second layer and the content of the second metal atom in the third layer is preferably greater than or equal to 5 ppm, more preferably greater than or equal to 10 ppm, further preferably greater than or equal to 20 ppm, preferably less than or equal to 300 ppm, more preferably less than or equal to 250 ppm, further preferably less than or equal to 200 ppm and especially preferably less than or equal to 150 ppm. When the content of the first metal atom is greater than or equal to the above lower limit and less than or equal to the above upper limit, the adhesivity between a laminated glass member and the interlayer film or the adhesivity between respective layers in the interlayer film can be further well controlled, and an increase in the YI value measured at the end part of the sheet of laminated glass is further suppressed.

In the case where the interlayer film includes the alkali metal, each of the content of the alkali metal in the interlayer film, the content of the alkali metal in the first layer, the content of the alkali metal in the second layer and the content of the alkali metal in the third layer is preferably greater than or equal to 5 ppm, more preferably greater than or equal to 10 ppm, further preferably greater than or equal to 20 ppm, preferably less than or equal to 300 ppm, more preferably less than or equal to 250 ppm, further preferably less than or equal to 200 ppm and especially preferably less than or equal to 150 ppm. When the content of the alkali metal is greater than or equal to the above lower limit and less than or equal to the above upper limit, the adhesivity between a laminated glass member and the interlayer film or the adhesivity between respective layers in the interlayer film can be further well controlled, and an increase in the YI value measured at the end part of the sheet of laminated glass is further suppressed.

(Other Ingredients)

Each of the first layer, the second layer and the third layer may contain additives such as an ultraviolet ray screening agent, a flame retardant, an antistatic agent, a pigment, a dye, an adhesive force regulating agent, a moisture-resistance improving agent, a fluorescent brightening agent, and an infrared ray absorber, as necessary. One kind of these additives may be used alone, and two or more kinds thereof may be used in combination.

(Other Details of Interlayer Film for Laminated Glass)

From the viewpoints of further making a gap difficult to be generated at an end part of the sheet of laminated glass and further suppressing an increase in the YI value measured at the end part of the sheet of laminated glass, it is preferred that the value of an alkali titer of the first layer be a positive value.

From the viewpoint of further improving the sound insulating performance of laminated glass, it is preferred that the glass transition temperature of the first layer be lower than or equal to 20° C. The glass transition temperature of the first layer is preferably higher than or equal to −15° C.

The thickness of the interlayer film for laminated glass according to the present invention is not particularly limited. From the viewpoint of the practical aspect and the viewpoint of sufficiently heightening the heat shielding properties, the thickness of the interlayer film is preferably greater than or equal to 0.1 mm, more preferably greater than or equal to 0.25 mm, preferably less than or equal to 3 mm and more preferably less than or equal to 1.5 mm. When the thickness of the interlayer film is greater than or equal to the above lower limit, the penetration resistance of laminated glass is enhanced. When the thickness of the interlayer film is lower than or equal to the above upper limit, the transparency of the interlayer film is further enhanced.

The thickness of the interlayer film is defined as T. From the viewpoints of further making a gap difficult to be generated at an end part of the sheet of laminated glass and further suppressing an increase in the YI value measured at the end part of the sheet of laminated glass, the thickness of the first layer is preferably greater than or equal to 0.0625 T, more preferably greater than or equal to 0.1 T, preferably less than or equal to 0.375 T and more preferably less than or equal to 0.25 T.

From the viewpoints of further making a gap difficult to be generated at an end part of the sheet of laminated glass and further suppressing an increase in the YI value measured at the end part of the sheet of laminated glass, the thickness of each of the second layer and the third layer is preferably greater than or equal to 0.625 T, more preferably greater than or equal to 0.75 T, preferably less than or equal to 0.9375 T and more preferably less than or equal to 0.9 T. Moreover, when the thickness of each of the second layer and the third layer is greater than or equal to the above lower limit and less than or equal to the above upper limit, it is possible to suppress the bleed-out of the plasticizer.

From the viewpoints of further making a gap difficult to be generated at an end part of the sheet of laminated glass and further suppressing an increase in the YI value measured at the end part of the sheet of laminated glass, in the case where the interlayer film is provided with the second layer and the third layer, the total thickness of the second layer and the third layer is preferably greater than or equal to 0.625 T, more preferably greater than or equal to 0.75 T, preferably less than or equal to 0.9375 T and more preferably less than or equal to 0.9 T. Moreover, when the total thickness of the second layer and the third layer is greater than or equal to the above lower limit and less than or equal to the above upper limit, it is possible to suppress the bleed-out of the plasticizer.

Although the production method of the interlayer film for laminated glass according to the present invention is not particularly limited, examples thereof include a method of separately forming respective resin compositions used for constituting respective layers into respective layers, and then, for example, allowing the respective obtained layers to be layered, a method of allowing respective resin compositions used for constituting respective layers to be coextruded using an extruder and allowing the respective layers to be layered, and the like. A production method of extrusion-molding is preferred because the method is suitable for continuous production.

Because the interlayer film is allowed to be excellent in production efficiency, it is preferred that respective polyvinyl acetal resins contained in the second layer and the third layer be the same as each other, it is more preferred that respective polyvinyl acetal resins contained in the second layer and the third layer be the same as each other and respective plasticizers contained therein be the same as each other, and it is further preferred that the second layer and the third layer be formed from the same resin composition as each other.

(Laminated Glass)

Figure 2:
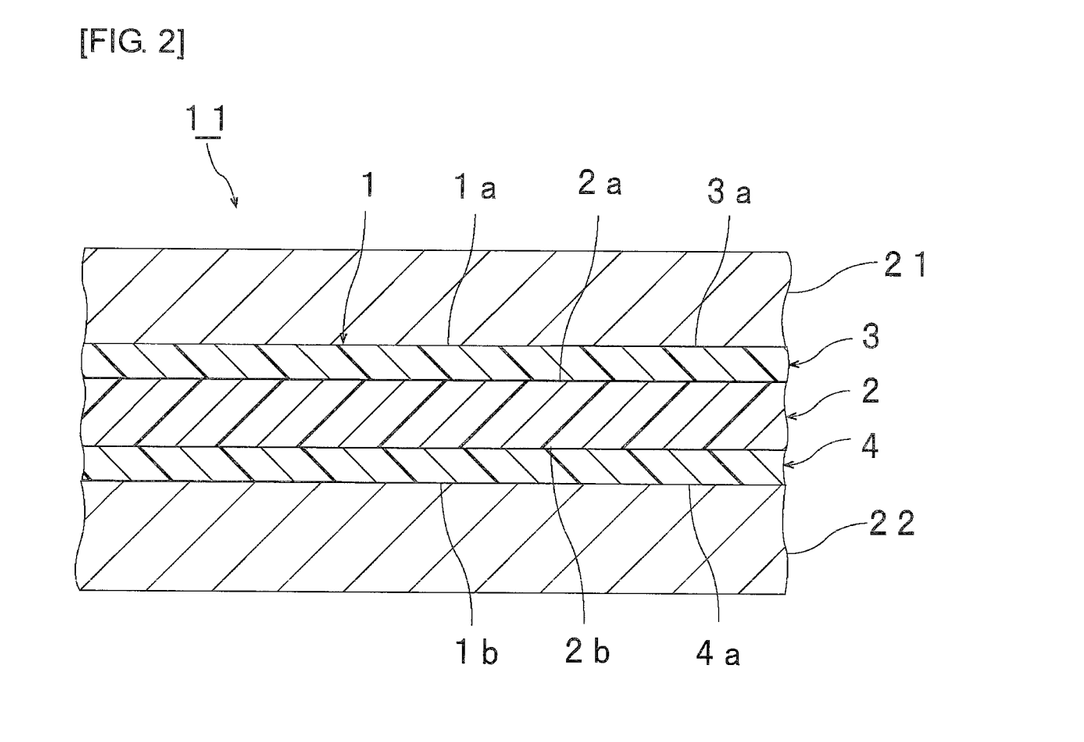
FIG. 2 is a partially cut-away sectional view schematically showing an example of laminated glass prepared with the interlayer film for laminated glass shown in FIG. 1.

FIG. 2 shows an example of laminated glass prepared with an interlayer film for laminated glass in accordance with one embodiment of the present invention schematically represented as a sectional view.

Laminated glass 11 shown in FIG. 2 is provided with a first laminated glass member 21, a second laminated glass member 22 and an interlayer film 1. The interlayer film 1 is arranged between the first laminated glass member 21 and the second laminated glass member 22 to be sandwiched.

The first laminated glass member 21 is layered on a first surface 1a of the interlayer film 1. The second laminated glass member 22 is layered on a second surface 1b opposite to the first surface 1a of the interlayer film 1. The first laminated glass member 21 is layered on an outer surface 3a of a second layer 3 of the interlayer film 1. The second laminated glass member 22 is layered on an outer surface 4a of a third layer 4 of the interlayer film 1.

As described above, the laminated glass according to the present invention is provided with a first laminated glass member, a second laminated glass member and an interlayer film arranged between the first laminated glass member and the second laminated glass member, and the interlayer film is the interlayer film for laminated glass according to the present invention.

Examples of the laminated glass member include a glass plate, a PET (polyethylene terephthalate) film, and the like. As the laminated glass, laminated glass in which an interlayer film is sandwiched between a glass plate and a PET film or the like, as well as laminated glass in which an interlayer film is sandwiched between two glass plates, is included. The laminated glass is a laminate provided with a glass plate, and it is preferred that at least one glass plate be used. It is preferred that each of the first laminated glass member and the second laminated glass member be a glass plate or a PET (polyethylene terephthalate) film and the interlayer film include at least one glass plate as the first laminated glass member or the second laminated glass member. It is especially preferred that both of the first laminated glass member and the second laminated glass member be glass plates.

Examples of the glass plate include a sheet of inorganic glass and a sheet of organic glass. Examples of the inorganic glass include float plate glass, heat ray-absorbing plate glass, heat ray-reflecting plate glass, polished plate glass, figured glass, wired plate glass and the like. The organic glass is synthetic resin glass substituted for inorganic glass. Examples of the organic glass include a polycarbonate plate, a poly(meth)acrylic resin plate, and the like. Examples of the poly(meth)acrylic resin plate include a polymethyl (meth) acrylate plate, and the like.

The thickness of the laminated glass member is preferably greater than or equal to 1 mm, preferably less than or equal to 5 mm and more preferably less than or equal to 3 mm. Moreover, in the case where the laminated glass member is a glass plate, the thickness of the glass plate is preferably greater than or equal to 1 mm, preferably less than or equal to 5 mm and more preferably less than or equal to 3 mm. In the case where the laminated glass member is a PET film, the thickness of the PET film is preferably greater than or equal to 0.03 mm and preferably less than or equal to 0.5 mm.

The production method of the laminated glass is not particularly limited. For example, an interlayer film is sandwiched between the first laminated glass member and the second laminated glass member, and the air remaining between the first laminated glass member and the interlayer film and between the second laminated glass member and the interlayer film is removed by allowing the members to pass through a pressing roll or by putting the members into a rubber bag and allowing the contents to be sucked under reduced pressure. Afterward, the members are preliminarily bonded together at about 70 to 110° C. to obtain a laminate. Next, by putting the laminate into an autoclave or by pressing the laminate, the members are press-bonded together at about 120 to 150° C. and under a pressure of 1 to 1.5 MPa. In this way, laminated glass can be obtained.

The interlayer film and the laminated glass can be used for automobiles, railway vehicles, aircraft, ships, buildings and the like. The interlayer film and the laminated glass can also be used for applications other than these applications. It is preferred that the interlayer film and the laminated glass be an interlayer film and laminated glass for vehicles or for building, and it is more preferred that the interlayer film and the laminated glass be an interlayer film and laminated glass for vehicles. The interlayer film and the laminated glass can be used for a windshield, side glass, rear glass or roof glass of an automobile and the like. The interlayer film and the laminated glass are suitably used for automobiles. The interlayer film is used for obtaining laminated glass of an automobile.

Hereinafter, the present invention will be described in more detail with reference to examples. The present invention is not limited only to these examples.

With regard to the polyvinyl butyral (PVB) resin used in the following examples and comparative examples, the butyralization degree (the acetalization degree), the acetylation degree and the content of the hydroxyl group were measured by a method in accordance with JIS K6728 "Testing methods for polyvinyl butyral". In this connection, even in the cases of being measured according to ASTM D1396-92, numerical values similar to those obtained by a method in accordance with JIS K6728 "Testing methods for polyvinyl butyral" were exhibited.

Moreover, the following hindered amine light stabilizers (HALSs) were used in examples and comparative examples.

TINUVIN 765 (available from BASF Japan Ltd., N—C (alkyl group) type, the molecular weight of 509)

TINUVIN 622SF (available from BASF Japan Ltd., N—C (alkyl group) type, the molecular weight of 1000 or more)

ADK STAB LA-81 (available from ADEKA CORPORATION, N—OR (alkoxy group) type, the molecular weight of 678)

TINUVIN XT-855FF (available from BASF Japan Ltd., N—OR (alkoxy group) type)

TINUVIN 770DF (available from BASF Japan Ltd., N—H (hydrogen atom) type, the molecular weight of 481)

Hostavin N24 (available from Clariant Japan K.K., N—H (hydrogen atom) type, the molecular weight of 632)

Chimassorb 944FDL (available from BASF Japan Ltd., N—H (hydrogen atom) type, the molecular weight of 1000 or more)

Moreover, the following oxidation inhibitors were used in examples and comparative examples.

BHT (2,6-di-t-butyl-p-cresol, the molecular weight of 220)

IRGANOX 1010 (available from BASF Japan Ltd., an oxidation inhibitor including a phenol skeleton, the molecular weight of 1178)

IRGANOX 245 (available from BASF Japan Ltd., an oxidation inhibitor including a phenol skeleton, the molecular weight of 587)

ADK STAB AO-40 (available from ADEKA CORPORATION, an oxidation inhibitor including a phenol skeleton, the molecular weight of 383)

EXAMPLE 1

Preparation of Composition X for Forming First Layer:

One hundred parts by weight of a polyvinyl acetal resin (a polyvinyl butyral (PVB) resin, the average polymerization degree of the polyvinyl alcohol (PVA) of 2300, the content of the hydroxyl group of 23.2% by mole, the acetylation degree of 12.5% by mole, the acetalization degree of 64.3% by mole), 60 parts by weight of triethylene glycol di-2-ethylhexanoate (3GO), which is a plasticizer, 0.2 part by weight of TINUVIN 765 (available from BASF Japan Ltd., N-alkyl group type, the molecular weight of 509) and 0.2 part by weight of BHT (2,6-di-t-butyl-p-cresol, the molecular weight of 220) were mixed to obtain Composition X for Forming a First Layer.

Preparation of Composition Y for Forming Second Layer and Third Layer:

One hundred parts by weight of a polyvinyl acetal resin (a polyvinyl butyral (PVB) resin, the average polymerization degree of the polyvinyl alcohol (PVA) of 1700, the content of the hydroxyl group of 34.5% by mole, the acetylation degree of 0.8% by mole, the acetalization degree of 64.8% by mole), 31.5 parts by weight of triethylene glycol di-2-ethylhexanoate (3GO), which is a plasticizer, and a magnesium-containing compound in an amount that the content thereof in the interlayer film becomes 60 ppm were mixed to obtain Composition Y for forming a second layer and a third layer. In this connection, a magnesium-containing mixture (magnesium acetate:magnesium 2-ethylbutyrate=50% by weight:50% by weight) was used.

Preparation of Interlayer Film:

By allowing the Composition X for forming a first layer and the Composition Y for forming a second layer and a third layer to be coextruded using a coextruder, an interlayer film (800 μm in thickness) having a layered structure with a stack of a second layer (350 μm in thickness)/a first layer (100 μm in thickness)/a third layer (350 μm in thickness) was prepared.

Preparation of Laminated Glass:

The interlayer film (multilayer) obtained was cut into a size of 8 cm in longitudinal length×8 cm in transversal length. Next, the interlayer film was sandwiched between two sheets of clear glass (8 cm in longitudinal length×8 cm in transversal length×2.5 mm in thickness), held in place for 30 minutes at 90° C. and pressed under vacuum with a vacuum laminator to obtain a laminate. With regard to the laminate, interlayer film portions protruded from the sheet of glass were cut away to obtain a sheet of laminated glass.

Examples 2 to 21 and Comparative Examples 1 to 5

An interlayer film and a sheet of laminated glass were prepared in the same manner as that in Example 1 except that the kind of the ingredient contained in the first layer, the second layer and the third layer and the content of the ingredient were set to those listed in the following Tables 1 to 3.

(Evaluation)

(1) Glass Transition Temperature of First Layer

Kneaded products having respective compositions of the first layer in examples and comparative examples were prepared. The kneaded product obtained was press-molded with a press molding machine to obtain a resin film A with an average thickness of 0.35 mm. The resin film A obtained was allowed to stand for 2 hours under the condition of 25° C. and a relative humidity of 30%. After allowed to stand for 2 hours, the viscoelasticity thereof was measured by means of the "ARES-G2" available from TA Instruments Japan Inc. As a jig, a parallel plate with a diameter of 8 mm was used. The measurement was performed under the condition in which the temperature is decreased from 100° C. to −10° C. at a temperature decreasing rate of 3° C./minute and under the condition of a frequency of 1 Hz and a strain of 1%. In the measurement results obtained, the peak temperature of the loss tangent was defined as the glass transition temperature Tg (° C.).

(2) Glass Transition Temperature of Second Layer and Third Layer

Kneaded products having respective compositions of the second layer and third layer in examples and comparative examples were prepared. The kneaded product obtained was press-molded with a press molding machine to obtain a resin film A with an average thickness of 0.35 mm. The resin film A obtained was allowed to stand for 2 hours under the condition of 25° C. and a relative humidity of 30%. After allowed to stand for 2 hours, the viscoelasticity thereof was measured by means of the "ARES-G2" available from TA Instruments Japan Inc. As a jig, a parallel plate with a diameter of 8 mm was used. The measurement was performed under the condition in which the temperature is decreased from 100° C. to −10° C. at a temperature decreasing rate of 3° C./minute and under the condition of a frequency of 1 Hz and a strain of 1%. In the measurement results obtained, the peak temperature of the loss tangent was defined as the glass transition temperature Tg (° C.).

Moreover, the glass transition temperature Tg was measured by the following method. After the multi-layered interlayer film obtained was stored for 1 month under the condition of a temperature of 23° C. and a humidity of 30%, respective layers (the first layer, the second layer and the third layer) were peeled off from one another to be isolated from one another. Each layer as an object to be measured, which was press-molded with a press molding machine and has an average thickness of 0.35 mm, was allowed to stand for 2 hours under the condition of 25° C. and a relative humidity of 30%, and was measured for the viscoelasticity using the "ARES-G2" available from TA Instruments Japan Inc. A parallel plate with a diameter of 8 mm was used as a jig, and the measurement was performed under the condition in which the temperature is decreased from 100° C. to −10° C. at a temperature decreasing rate of 3° C./minute and under the condition of a frequency of 1 Hz and a strain of 1%. In the measurement results obtained, the peak temperature of the loss tangent was defined as the glass transition temperature Tg (° C.). In any of the foregoing methods, the same glass transition temperature Tg was obtained.

(3) State of Gap Generated at End Part of Sheet of Laminated Glass

A sheet of laminated glass was irradiated with ultraviolet rays (quartz glass mercury lamp (750 W)) for 2000 hours in accordance with JIS R3205 using an ultraviolet-ray irradiation device ("HLG-2S" available from Suga Test Instruments Co., Ltd.). After the test, the end part of the sheet of laminated glass was observed to evaluate the state of a gap generated at the end part of the sheet of laminated glass. The state of the gap was judged according to the following criteria.

[Criteria for Judgment in State of Gap]

◯: At the end part of the sheet of laminated glass, there is no gap or the gap is generated only within a distance of shorter than or equal to 1 mm from the end part in the inwardly facing direction orthogonal to the end side including the end part.

x: At the end part of the sheet of laminated glass, the gap extends by a distance of longer than 1 mm from the end part in the inwardly facing direction orthogonal to the end side including the end part.

(4) ΔYI Value Measured at End Part of Sheet of Laminated Glass

The sheet of laminated glass obtained was measured for the YI value (the yellowness index, the yellow index) by a transmission method in accordance with JIS K7105 using a spectrophotometer ("U-4100" available from Hitachi High-Technologies Corporation).

The end part of the sheet of laminated glass was measured for the initial YI value. Next, the sheet of laminated glass was heated for 4 weeks at 100° C. After the heating, the end part of the sheet of laminated glass was measured for the YI value after heating. In this connection, the measurement area of the Y value was defined as an area within a distance of 5 mm from the end part in the inwardly facing direction orthogonal to the end side including the end part. The absolute value of the difference between the initial YI value and the YI value after heating was defined as the ΔYI to be determined. The ΔYI value was judged according to the following criteria.

[Criteria for Judgment in ΔYI Value]

◯: The ΔYI value is less than or equal to 20.

x: The ΔYI value is greater than 20.

(5) Sound Insulating Properties

The laminated glass was excited by means of a vibration generator for a damping test ("Vibration exciter G21-005D" available from SHINKEN CO., LTD.) to obtain vibration characteristics, the vibration characteristics were amplified by a mechanical impedance measuring apparatus ("XG-81" available from RION Co., Ltd.), and the vibration spectrum was analyzed by an FFT spectrum analyzer ("FFT analyzer HP3582A" available from Yokogawa Electric Corporation).

The results are shown in the following Tables 1 to 3. With regard to the evaluation for sound insulating properties, all the sheets of laminated glass in Examples 1 to 21 are excellent in sound insulating properties.

TABLE 1

| | | | Example 1 | Example 2 | Example 3 | Example 4 | Example 5 | Example 6 |
|---|---|---|---|---|---|---|---|---|
| First layer | Polyvinyl acetal resin | Acetalization degree | 64.3 | 64.3 | 64.3 | 64.3 | 64.3 | 64.3 |
| | | Content of hydroxyl group | 23.2 | 23.2 | 23.2 | 23.2 | 23.2 | 23.2 |
| | | Acetylation degree | 12.5 | 12.5 | 12.5 | 12.5 | 12.5 | 12.5 |
| | | Average polymerization degree | 2300 | 2300 | 2300 | 2300 | 2300 | 2300 |
| | Plasticizer | Kind | 3GO | 3GO | 3GO | 3GO | 3GO | 3GO |
| | | Content (Parts by weight) | 60 | 60 | 60 | 60 | 60 | 60 |
| | HALS | Kind | N-C type TINUVIN 765 | N-C type TINUVIN 622SF | N-OR type ADK STAB LA-81 | N-OR type TINUVIN XT-855FF | N-C type TINUVIN 765 | N-OR type TINUVIN XT-855FF |
| | | Content (Parts by weight) | 0.2 | 0.2 | 0.2 | 0.2 | 0.1 | 0.1 |
| | | Kind | — | — | — | — | N-C type TINUVIN 622SF | N-C type TINUVIN 765 |
| | | Content (Parts by weight) | — | — | — | — | 0.1 | 0.1 |
| | Oxidation inhibitor | Kind | BHT | BHT | BHT | BHT | BHT | BHT |
| | | Content (Parts by weight) | 0.2 | 0.2 | 0.2 | 0.2 | 0.2 | 0.2 |
| | | Kind | — | — | — | — | — | — |
| | | Content (Parts by weight) | — | — | — | — | — | — |
| Second and third layers | Polyvinyl acetal resin | Acetalization degree | 64.7 | 64.7 | 64.7 | 64.7 | 64.7 | 64.7 |
| | | Content of hydroxyl group | 34.5 | 34.5 | 34.5 | 34.5 | 34.5 | 34.5 |
| | | Acetylation degree | 0.8 | 0.8 | 0.8 | 0,8 | 0.8 | 0.8 |
| | | Average polymerization degree | 1700 | 1700 | 1700 | 1700 | 1700 | 1700 |
| | Plasticizer | Kind | 3GO | 3GO | 3GO | 3GO | 3GO | 3GO |
| | | Content (Parts by weight) | 31.5 | 31.5 | 31.5 | 31.5 | 31.5 | 31.5 |
| Content of Mg in interlayer film (ppm) | | | 60 | 60 | 60 | 60 | 60 | 60 |
| (1) Glass transition temperature of first layer (° C.) | | | 1.7 | 1.7 | 1.7 | 1.7 | 1.7 | 1.7 |
| (2) Glass transition temperature of second and third layers (° C.) | | | 39.0 | 39.0 | 39.0 | 39.0 | 39.0 | 39.0 |
| (3) State of gap | | | ◯ | ◯ | ◯ | ◯ | ◯ | ◯ |
| (4) Δ YI value | Judgment | | ◯ | ◯ | ◯ | ◯ | ◯ | ◯ |

| | | | Example 7 | Example 8 | Example 9 | Example 10 | Example 11 | Example 12 |
|---|---|---|---|---|---|---|---|---|
| First layer | Polyvinyl acetal resin | Acetalization degree | 64.3 | 64.3 | 64.3 | 64.3 | 64.3 | 64.3 |
| | | Content of hydroxyl group | 23.2 | 23.2 | 23.2 | 23.2 | 23.2 | 23.2 |
| | | Acetylation degree | 12.5 | 12.5 | 12.5 | 12.5 | 12.5 | 12.5 |
| | | Average polymerization degree | 2300 | 2300 | 2300 | 2300 | 1500 | 3000 |
| | Plasticizer | Kind | 3GO | 3GO | 3GO | 3GO | 3GO | 3GO |
| | | Content (Parts by weight) | 60 | 60 | 60 | 60 | 60 | 60 |
| | HALS | Kind | N-C type TINUVIN 765 | N-C type TINUVIN 765 | N-OR type TINUVIN XT-855FF | N-OR type TINUVIN XT-855FF | N-C type TINUVIN 765 | N-C type TINUVIN 765 |
| | | Content (Parts by weight) | 0.02 | 0.5 | 0.02 | 0.5 | 0.2 | 0.2 |
| | | Kind | — | — | — | — | — | — |
| | | Content (Parts by weight) | — | — | — | — | — | — |

TABLE 1-continued

|  |  |  |  |  |  |  |  |  |
|---|---|---|---|---|---|---|---|---|
|  | Oxidation inhibitor | Kind | BHT | BHT | BHT | BHT | BHT | BHT |
|  |  | Content (Parts by weight) | 0.2 | 0.2 | 0.2 | 0.2 | 0.2 | 0.2 |
|  |  | Kind | — | — | — | — | — | — |
|  |  | Content (Parts by weight) | — | — | — | — | — | — |
| Second and third layers | Polyvinyl acetal resin | Acetalization degree | 64.7 | 64.7 | 64.7 | 64.7 | 64.7 | 64.7 |
|  |  | Content of hydroxyl group | 34.5 | 34.5 | 34.5 | 34.5 | 34.5 | 34.5 |
|  |  | Acetylation degree | 0.8 | 0.8 | 0.8 | 0.8 | 0.8 | 0.8 |
|  |  | Average polymerization degree | 1700 | 1700 | 1700 | 1700 | 1700 | 1700 |
|  | Plasticizer | Kind | 3GO | 3GO | 3GO | 3GO | 3GO | 3GO |
|  |  | Content (Parts by weight) | 31.5 | 31.5 | 31.5 | 31.5 | 31.5 | 31.5 |
| Content of Mg in interlayer film (ppm) |  |  | 60 | 60 | 60 | 60 | 60 | 60 |
| (1) Glass transition temperature of first layer (° C.) |  |  | 1.7 | 1.7 | 1.7 | 1.7 | 1.7 | 1.7 |
| (2) Glass transition temperature of second and third layers (° C.) |  |  | 39.0 | 39.0 | 39.0 | 39.0 | 39.0 | 39.0 |
| (3) State of gap |  |  | ○ | ○ | ○ | ○ | ○ | ○ |
| (4) Δ YI value | Judgment |  | ○ | ○ | ○ | ○ | ○ | ○ |

TABLE 2

|  |  |  | Example 13 | Example 14 | Example 15 | Example 16 | Example 17 |
|---|---|---|---|---|---|---|---|
| First layer | Polyvinyl acetal resin | Acetalization degree | 79 | 54 | 64.3 | 64.3 | 64.3 |
|  |  | Content of hydroxyl group | 19.4 | 21 | 23.2 | 23.2 | 23.2 |
|  |  | Acetylation degree | 1.6 | 25 | 12.5 | 12.5 | 12.5 |
|  |  | Average polymerization degree | 2300 | 2300 | 2300 | 2300 | 2300 |
|  | Plasticizer | Kind | 3GO | 3GO | 3GO | 3GO | 3GO |
|  |  | Content (Parts by weight) | 75 | 60 | 60 | 60 | 60 |
|  | HALS | Kind | N-C type TINUVIN 765 | N-C type TINUVIN 765 | N-C type TINUVIN 765 | N-C type TINUVIN 765 | N-C type TINUVIN 765 |
|  |  | Content (Parts by weight) | 0.2 | 0.2 | 0.2 | 0.2 | 0.2 |
|  |  | Kind | — | — | — | — | — |
|  |  | Content (Parts by weight) | — | — | — | — | — |
|  | Oxidation inhibitor | Kind | BHT | BHT | BHT | BHT | BHT |
|  |  | Content (Parts by weight) | 0.2 | 0.2 | 0.2 | 0.2 | 0.02 |
|  |  | Kind | — | — | — | — | IRGANOX 1010 |
|  |  | Content (Parts by weight) | — | — | — | — | 0.2 |
| Second and third layers | Polyvinyl acetal resin | Acetalization degree | 66.7 | 68.5 | 64.7 | 64.7 | 64.7 |
|  |  | Content of hydroxyl group | 32.5 | 30.7 | 34.5 | 34.5 | 34.5 |
|  |  | Acetylation degree | 0.8 | 0.8 | 0.8 | 0.8 | 0.8 |
|  |  | Average polymerization degree | 1700 | 1700 | 1700 | 1700 | 1700 |
|  | Plasticizer | Kind | 3GO | 3GO | 3GO | 3GO | 3GO |
|  |  | Content (Parts by weight) | 34 | 34 | 31.5 | 31.5 | 31.5 |
| Content of Mg in interlayer film (ppm) |  |  | 60 | 60 | 5 | 100 | 60 |
| (1) Glass transition temperature of first layer (° C.) |  |  | −3.2 | −4.8 | 1.7 | 1.7 | 1.7 |
| (2) Glass transition temperature of second and third layers (° C.) |  |  | 32.7 | 32.4 | 39.0 | 39.0 | 39.0 |
| (3) State of gap |  |  | ○ | ○ | ○ | ○ | ○ |
| (4) Δ YI value | Judgment |  | ○ | ○ | ○ | ○ | ○ |

|  |  |  | Example 18 | Example 19 | Example 20 | Example 21 |
|---|---|---|---|---|---|---|
| First layer | Polyvinyl acetal resin | Acetalization degree | 64.3 | 64.3 | 64.3 | 67.2 |
|  |  | Content of hydroxyl group | 23.2 | 23.2 | 23.2 | 25.2 |
|  |  | Acetylation degree | 12.5 | 12.5 | 12.5 | 7.6 |
|  |  | Average polymerization degree | 2300 | 2300 | 2300 | 1700 |
|  | Plasticizer | Kind | 3GO | 3GO | 3GO | 3GO |
|  |  | Content (Parts by weight) | 60 | 60 | 60 | 75 |
|  | HALS | Kind | N-C type TINUVIN 765 | N-C type TINUVIN 765 | N-C type TINUVIN 765 | N-C type TINUVIN 765 |
|  |  | Content (Parts by weight) | 0.2 | 0.2 | 0.2 | 0.2 |
|  |  | Kind | — | — | — | — |
|  |  | Content (Parts by weight) | — | — | — | — |
|  | Oxidation inhibitor | Kind | BHT | BHT | BHT | BHT |
|  |  | Content (Parts by weight) | 0.02 | 0.02 | 0.01 | 0.2 |
|  |  | Kind | IRGANOX 245 | ADK STAB AO-40 | — | — |
|  |  | Content (Parts by weight) | 0.2 | 0.2 | — | — |

TABLE 2-continued

|  |  |  |  |  |  |  |
|---|---|---|---|---|---|---|
| Second and third layers | Polyvinyl acetal resin | Acetalization degree | 64.7 | 64.7 | 64.7 | 66 |
|  |  | Content of hydroxyl group | 34.5 | 34.5 | 34.5 | 33.2 |
|  |  | Acetylation degree | 0.8 | 0.8 | 0.8 | 0.8 |
|  |  | Average polymerization degree | 1700 | 1700 | 1700 | 1700 |
|  | Plasticizer | Kind | 3GO | 3GO | 3GO | 3GO |
|  |  | Content (Parts by weight) | 31.5 | 31.5 | 31.5 | 34 |
| Content of Mg in interlayer film (ppm) |  |  | 60 | 60 | 60 | 60 |
| (1) Glass transition temperature of first layer (° C.) |  |  | 1.7 | 1.7 | 1.7 | 2.5 |
| (2) Glass transition temperature of second and third layers (° C.) |  |  | 39.0 | 39.0 | 39.0 | 34.5 |
|  |  | (3) State of gap | ◯ | ◯ | ◯ | ◯ |
| (4) Δ YI value | Judgment |  | ◯ | ◯ | ◯ | ◯ |

TABLE 3

|  |  |  | Comp. Ex. 1 | Comp. Ex. 2 | Comp. Ex. 3 | Comp. Ex. 4 | Comp. Ex. 5 |
|---|---|---|---|---|---|---|---|
| First layer | Polyvinyl acetal resin | Acetalization degree | 64.3 | 64.3 | 64.3 | 64.3 | 64.3 |
|  |  | Content of hydroxyl group | 23.2 | 23.2 | 23.2 | 23.2 | 23.2 |
|  |  | Acetylation degree | 12.5 | 12.5 | 12.5 | 12.5 | 12.5 |
|  |  | Average polymerization degree | 2300 | 2300 | 2300 | 2300 | 2300 |
|  | Plasticizer | Kind | 3GO | 3GO | 3GO | 3GO | 3GO |
|  |  | Content (Parts by weight) | 60 | 60 | 60 | 60 | 60 |
|  | HALS | Kind | — | N-H type TINUVIN 770DF | N-H type TINUVIN 770DF | N-H type Hostavin N24 | N-H type Chimassorb 944FDL |
|  |  | Content (Parts by weight) | — | 0.2 | 0.02 | 0.2 | 0.2 |
|  |  | Kind | — | — | — | — | — |
|  |  | Content (Parts by weight) | — | — | — | — | — |
|  | Oxidation inhibitor | Kind | BHT | BHT | BHT | BHT | BHT |
|  |  | Content (Parts by weight) | 0.2 | 0.2 | 0.2 | 0.2 | 0.2 |
|  |  | Kind | — | — | — | — | — |
|  |  | Content (Parts by weight) | — | — | — | — | — |
| Second and third layers | Polyvinyl acetal resin | Acetalization degree | 68.5 | 68.5 | 68.5 | 68.5 | 68.5 |
|  |  | Content of hydroxyl group | 30.7 | 30.7 | 30.7 | 30.7 | 30.7 |
|  |  | Acetylation degree | 0.8 | 0.8 | 0.8 | 0.8 | 0.8 |
|  |  | Average polymerization degree | 1700 | 1700 | 1700 | 1700 | 1700 |
|  | Plasticizer | Kind | 3GO | 3GO | 3GO | 3GO | 3GO |
|  |  | Content (Parts by weight) | 38.5 | 38.5 | 38.5 | 38.5 | 38.5 |
| Content of Mg in interlayer film (ppm) |  |  | 60 | 60 | 60 | 60 | 60 |
| (1) Glass transition temperature of first layer (° C.) |  |  | 1.7 | 1.7 | 1.7 | 1.7 | 1.7 |
| (2) Glass transition temperature of second and third layers (° C.) |  |  | 28.8 | 28.8 | 28.8 | 28.8 | 28.8 |
|  |  | (3) State of gap | X | ◯ | ◯ | ◯ | ◯ |
| (4) Δ YI value | Judgment |  | ◯ | X | X | X | X |

In Examples 1 to 21, the glass transition temperature of the second layer and third layer is higher than or equal to 32° C. As contrasted with Examples 1 to 21, only the kind of the polyvinyl acetal resin was changed so that the glass transition temperature of the second layer and third layer becomes lower than 32° C. to obtain respective interlayer films, and the respective interlayer films were used to prepare sheets of laminated glass. As a result thereof, with regard to the sheets of laminated glass thus prepared, as compared to sheets of laminated glass prepared with interlayer films in Examples 1 to 21, there is a tendency that a gap becomes easy to be generated at an end part of the sheet of laminated glass, and there is a tendency for the YI value measured at the end part of the sheet of laminated glass to be increased.

EXPLANATION OF SYMBOLS

1: Interlayer film
1a: First surface
1b: Second surface
2: First layer
2a: First surface
2b: Second surface
3: Second layer
3a: Outer surface
4: Third layer
4a: Outer surface
11: Laminated glass
21: First laminated glass member
22: Second laminated glass member

The invention claimed is:

1. An interlayer film for laminated glass, comprising a first layer which contains a polyvinyl butyral resin and triethylene glycol di-2-ethylhexanoate and a second layer which is arranged on a first surface side of the first layer and contains a polyvinyl butyral resin and triethylene glycol di-2-ethylhexanoate, an acetylation degree of the polyvinyl butyral resin contained in the first layer being greater than or equal to 0.1% by mole and less than or equal to 25% by mole,
a butyralization degree of the polyvinyl butyral resin contained in the first layer being greater than or equal to 47% by mole and less than or equal to 80% by mole,
an acetylation degree of the polyvinyl butyral resin contained in the second layer being greater than or equal to 0.01% by mole and less than or equal to 10% by mole,
a butyralization degree of the polyvinyl butyral resin contained in the second layer being greater than or equal to 55% by mole and less than or equal to 75% by mole, the first layer further containing a hindered amine light stabilizer having an alkyl group bonded to the nitrogen atom of a piperidine structure or an alkoxy group bonded to the nitrogen atom of a piperidine structure, the second layer having a glass transition temperature of higher than or equal to 32.4° C. and lower than or equal to 60° C., and the content of triethylene glycol di-2-ethylhexanoate contained in the first layer relative to 100 parts by weight of the polyvinyl butyral resin contained in the first layer being greater than the content of triethylene glycol di-2-ethylhexanoate contained in the second layer relative to 100 parts by weight of the polyvinyl butyral resin contained in the second layer.

2. The interlayer film for laminated glass according to claim 1, wherein at least one first metal atom selected from the group consisting of an alkaline earth metal, zinc and aluminum is included in the interlayer film, an alkali metal is not included or is included in the interlayer film, and the content of the first metal atom in the interlayer film is less than or equal to 150 ppm.

3. The interlayer film for laminated glass according to claim 1, wherein the polyvinyl butyral resin contained in the first layer is obtained by butyralizing a polyvinyl alcohol with an average polymerization degree of greater than or equal to 1500.

4. The interlayer film for laminated glass according to claim 1, wherein a content of the hydroxyl group of the polyvinyl butyral resin contained in the first layer is greater than or equal to 20% by mole and less than 30% by mole.

5. The interlayer film for laminated glass according to claim 1, wherein the glass transition temperature of the first layer is lower than or equal to 20° C.

6. The interlayer film for laminated glass according to claim 1, wherein the first layer contains an oxidation inhibitor having the molecular weight of greater than or equal to 250 and including a phenol skeleton.

7. The interlayer film for laminated glass according to claim 1, wherein the molecular weight of the hindered amine light stabilizer is less than or equal to 1000.

8. The interlayer film for laminated glass according to claim 1, further comprising a third layer which is arranged on a second surface side opposite to the first surface of the first layer and contains a polyvinyl acetal resin and a plasticizer.

9. The interlayer film for laminated glass according to claim 8, wherein the glass transition temperature of the third layer is higher than or equal to 32° C.

10. The interlayer film for laminated glass according to claim 8, wherein the glass transition temperature of the third layer is higher than or equal to 33° C.

11. The interlayer film for laminated glass according to claim 8, wherein the polyvinyl acetal resin contained in the third layer is a polyvinyl butyral resin, the plasticizer contained in the third layer is triethylene glycol di-2-ethylhexanoate, an acetylation degree of the polyvinyl butyral resin contained in the third layer is greater than or equal to 0.01% by mole and less than or equal to 10% by mole, and a butyralization degree of the polyvinyl butyral resin contained in the third layer is greater than or equal to 55% by mole and less than or equal to 75% by mole.

12. The interlayer film for laminated glass according to claim 8, wherein a thickness of the first layer is 0.25T to 0.375T, where T is a total thickness of the interlayer film.

13. The interlayer film for laminated glass according to claim 12, wherein a total thickness of the second and third layers is 0.625T to 0.75T.

14. The interlayer film for laminated glass according to claim 1, being used for obtaining laminated glass of an automobile.

15. The interlayer film for laminated glass according to claim 1, wherein the glass transition temperature of the second layer is higher than or equal to 33° C. and lower than or equal to 60° C.

16. The interlayer film for laminated glass according to claim 1, wherein the glass transition temperature of the second layer is higher than or equal to 32.4° C. and lower than or equal to 39° C.

17. The interlayer film for laminated glass according to claim 1, wherein the absolute value of the difference between the content of triethylene glycol di-2-ethyihexanoate contained in the first layer relative to 100 parts by weight of the polyvinyl butyral resin contained in the first layer and the content of triethylene glycol di-2-ethylhexanoate contained in the second layer relative to 100 parts by weight of the polyvinyl butyral resin contained in the second layer is 10 parts by weight.

18. The interlayer film for laminated glass according to claim 1, wherein the interlayer film satisfies at least one selected from constitutions (a), (b) and (c), as described below:

constitution (a): a content of the hydroxyl group of the polyvinyl butyral resin contained in the first layer is greater than or equal to 17% by mole and less than or equal to 23.2% by mole, and a content of the hydroxyl group of the polyvinyl butyral resin contained in the second layer is greater than or equal to 34.5% by mole and less than or equal to 35% by mole, constitution (b): a content of the hydroxyl group of the polyvinyl butyral resin contained in the first layer is greater than or equal to 17% by mole and less than or equal to 19.4% by mole, and a content of the hydroxyl group of the polyvinyl butyral resin contained in the second layer is greater than or equal to 32.5% by mole and less than or equal to 35% by mole, constitution (c): a content of the hydroxyl group of the polyvinyl butyral resin contained in the first layer is greater than or equal to 17% by mole and less than or equal to 21.0% by mole, and a content of the hydroxyl group of the polyvinyl butyral resin contained in the second layer is greater than or equal to 30.7% by mole and less than or equal to 35% by mole.

19. The interlayer film for laminated glass according to claim 1, wherein a content of the hydroxyl group of the polyvinyl butyral resin contained in the first layer is greater than or equal to 17% by mole and less than or equal to 23.2% by mole, and a content of the hydroxyl group of the polyvinyl butyral resin contained in the second layer is greater than or equal to 34.5% by mole and less than or equal to 35% by mole.

20. The interlayer film for laminated glass according to claim 1, wherein a content of the hydroxyl group of the polyvinyl butyral resin contained in the first layer is greater than or equal to 17% by mole and less than or equal to 19.4% by mole, and a content of the hydroxyl group of the polyvinyl butyral resin contained in the second layer is greater than or equal to 32.5% by mole and less than or equal to 35% by mole.

21. The interlayer film for laminated glass according to claim 1, wherein a content of the hydroxyl group of the polyvinyl butyral resin contained in the first layer is greater than or equal to 17% by mole and less than or equal to 21.0% by mole, and a content of the hydroxyl group of the polyvinyl butyral resin contained in the second layer is greater than or equal to 30.7% by mole and less than or equal to 35% by mole.

22. A laminated glass, comprising a first laminated glass member, a second laminated glass member and the interlayer film for laminated glass according to claim 1,
   wherein the interlayer film for laminated glass is arranged between the first laminated glass member and the second laminated glass member.

* * * * *